United States Patent
Abouelmaati (10) Patent No.: US 11,323,958 B2
(45) Date of Patent: May 3, 2022

(54) TRANSMITTER OUTAGE REPORTING

(71) Applicant: British Telecommunications Public Limited Company, London (GB)

(72) Inventor: Dalia Abouelmaati, London (GB)

(73) Assignee: British Telecommunications Public Limited Company, London (GB)

( * ) Notice: Subject to any disclaimer, the term of this patent is extended or adjusted under 35 U.S.C. 154(b) by 631 days.

(21) Appl. No.: 16/085,765

(22) PCT Filed: Feb. 24, 2017

(86) PCT No.: PCT/EP2017/054309
§ 371 (c)(1),
(2) Date: Sep. 17, 2018

(87) PCT Pub. No.: WO2017/162399
PCT Pub. Date: Sep. 28, 2017

(65) Prior Publication Data
US 2020/0305073 A1  Sep. 24, 2020

(30) Foreign Application Priority Data

Mar. 22, 2016 (EP) .................................. 16161677

(51) Int. Cl.
*H04W 52/02* (2009.01)
*H04W 4/20* (2018.01)
*H04W 40/24* (2009.01)

(52) U.S. Cl.
CPC ......... *H04W 52/0206* (2013.01); *H04W 4/20* (2013.01); *H04W 40/244* (2013.01)

(58) Field of Classification Search
None
See application file for complete search history.

(56) References Cited

U.S. PATENT DOCUMENTS 8,116,815 B2 * 2/2012 Loh ..................... H04W 24/04
455/561
2004/0106408 A1 6/2004 Beasley et al.
(Continued)

FOREIGN PATENT DOCUMENTS

CN 101583150 B 4/2011
EP 2129175 12/2009
(Continued)

OTHER PUBLICATIONS

Application and Filing Receipt for U.S. Appl. No. 16/500,589, filed Oct. 3, 2019, Inventor: Abouelmaati.
(Continued)

*Primary Examiner* — James P Duffy
(74) *Attorney, Agent, or Firm* — Patterson Thuente Pedersen, P.A.

(57) ABSTRACT

If a cellular base station detects that it is about to shut down, either because no mobile terminals are within range, or because of a loss of power, for example because a user has deliberately switched it off, it first broadcasts a report that is about to shut down. This broadcast signal is picked up by the neighboring cells and used to update their neighbor lists, thus avoiding a false alarm which would otherwise be generated by the neighbors and transmitted to a centralized Operation Administration and Maintenance system when the shut-down cell fails to be detected on the next sampling cycle. The neighbors can then retain the shut-down base station in the neighbor list. The cause of the shut-down may be identified in the shut-down report, and a self-organizing frequency reuse plan adjusted if the base station is shut down altogether (for example because of a loss of power) but remain unchanged if the base station is continuing to operate in receive-only mode because no mobile terminals are within its range. The base station has a standby battery (Continued)

which allows a "graceful" shutdown even if the main power supply is cut off.

4 Claims, 5 Drawing Sheets

(56) References Cited

U.S. PATENT DOCUMENTS

| | | | |
|---|---|---|---|
| 2009/0013210 A1 | 1/2009 | McIntosh et al. | |
| 2009/0117852 A1 | 5/2009 | Loh | |
| 2009/0161556 A1 | 6/2009 | Qian et al. | |
| 2009/0164625 A1 | 6/2009 | Roll et al. | |
| 2010/0208621 A1 | 8/2010 | Morper | |
| 2010/0216453 A1* | 8/2010 | Kallin | H04W 48/20 455/424 |
| 2011/0208992 A1 | 8/2011 | Cohen et al. | |
| 2012/0094661 A1* | 4/2012 | Frenger | H04W 72/1278 455/434 |
| 2013/0215768 A1 | 8/2013 | Meloche | |
| 2013/0322234 A1 | 12/2013 | Mohseni et al. | |
| 2014/0099942 A1* | 4/2014 | Kim | H04W 52/40 455/424 |
| 2015/0009901 A1 | 1/2015 | Gorajala et al. | |
| 2015/0058481 A1 | 2/2015 | Miller et al. | |
| 2015/0327062 A1 | 11/2015 | Tatavarty et al. | |
| 2017/0257810 A1 | 9/2017 | Gandhi | |

FOREIGN PATENT DOCUMENTS

| | | |
|---|---|---|
| EP | 2 154 918 A1 | 2/2010 |
| EP | 2 230 864 A1 | 9/2010 |
| EP | 2 693 810 A1 | 2/2014 |
| EP | 2 770 772 A1 | 8/2014 |
| EP | 2797354 A1 | 10/2014 |
| EP | 2 800 425 A1 | 11/2014 |
| WO | WO 2008/030171 A2 | 3/2008 |
| WO | WO-2015079195 A1 | 6/2015 |
| WO | WO 2015/160296 A1 | 10/2015 |
| WO | WO-2016118899 A1 | 7/2016 |
| WO | WO 2017/162400 A1 | 9/2017 |
| WO | WO-2017162399 A1 | 9/2017 |
| WO | WO-2018/184748 A1 | 10/2018 |

OTHER PUBLICATIONS

Combination Search and Examination Report under Sections 17 & 18 (3) for Great Britain Application No. GB1705353.9, dated Aug. 29, 2017, 5 pages.
Examination Report for GB Application No. GB1618269.3 dated Mar. 16, 2017, 5 pages.
Extended European Search Report for Application No. 17164621.9, dated Sep. 14, 2017, 10 pages.
Extended European Search Report, Application No. 16196346.7, dated Feb. 27, 2017, 14 pages.
International Preliminary Report on Patentability for Application No. PCT/EP2017/075237, dated Oct. 4, 2018, 18 pages.
International Preliminary Reporton Patentability for Application No. PCT/EP2018/052281, dated Mar. 18, 2019, 12 pages.
International Search Report and Written Opinion for Application No. PCT/EP2018/052281, dated Apr. 5, 2018, 13 pages.
Great Britain Search Report, Application No. GB1604823.3, dated Sep. 22, 2016, 5 pages.
Application and Filing Receipt for U.S. Appl. No. 16/343,842, filed Apr. 22, 2019, Inventor: Abouelmaati.
International Search Report and Written Opinion for corresponding PCT Application No. PCT/EP2017/075237 dated Jan. 18, 2018, 16 pages.
3GPP TSG-RAN WG3 #75; Huawei, "Potential solutions for self healing", Agenda Item: 11.2; R3-120128; Dresden, Germany, Feb. 6-10, 2012; 3 pages total.
3GPP TSG-RAN WG3 #74; Huawei, Telefonica, Orange, "Clarification for Self-healing at RAN", Agenda Item: 11.6; R3-112773; San Francisco, US, Nov. 14-18; 3 pages total.
International Preliminary Report on Patentability for International Application No. PCT/EP2017/054309 dated Sep. 25, 2018; 8 pages.
International Preliminary Report on Patentability for International Application No. PCT/EP2017/054312 dated May 15, 2018; 10 pages.
International Search Report and Written Opinion for International Application No. PCT/EP2017/054309 dated May 12, 2017; 11 pages.
International Search Report and Written Opinion for International Application No. PCT/EP2017/054312 dated Apr. 7, 2017; 10 pages.
Combined Search and Examination Report for GB Application No. GB1604866.2 dated Sep. 13, 2016; 6 pages.
Examination Report for GB Application No. GB 1604866.2 dated May 8, 2018; 4 pages.
Wei et al.; "Cooperative Cell Outage Detection in Self-Organizing Femtocell Networks" INFOCOM, 2013 proceedings IEEE, Apr. 14, 2013, XP032440824, DOI: 10.1109/INFCOM.2013.6566865 [retrieved Dec. 3, 2018]; 9 pages. http://www.cse.ust.hk/~gswwang/Wei_files/papers/infocom13_cod.pdf.
Abouelmaati et al.; "Femtocell Collaborative Outage Detection (FCOD) with Built-in Sleeping Mode Recovery (SMR) Technique" Oct. 24, 2015, Springer, DE, XP055295003, ISSN: 1867-8211, ISBN: 978-3-642-17758-3 vol. 156 ,pp. 477-486, DOI: 1007/978-3-319-24540-9_39.
Image File Wrapper for U.S. Appl. No. 16/085,781, filed Sep. 17, 2018, Inventor(s): Abouelmaati.
Communication pursuant to Article 94(3) EPC for Application No. 17707524.9, dated Mar. 18, 2020, 4 pages.
Communication pursuant to Article 94(3) EPC for Application No. 17707524.9, dated May 27, 2021, 6 pages.

* cited by examiner

TRANSMITTER OUTAGE REPORTING

CROSS-REFERENCE TO RELATED APPLICATION

The present application is a National Phase entry of PCT Application No. PCT/EP2017/054309, filed Feb. 24, 2017, which claims priority from EP Patent Application No. 16161677.6, filed Mar. 22, 2016 each of which is hereby fully incorporated herein by reference.

TECHNICAL FIELD

This disclosure relates to self organizing communications networks, and in particular to an improved process for reconfiguring such networks as individual communications nodes lose contact with each other.

BACKGROUND

Self-Organizing Networks (SONs) have an important role in the development of the next generation of mobile networks by introducing automated schemes to allow base stations to be added and removed from the network without the need for human intervention to reorganize the network by updating neighbor lists, frequency allocations and other interactions between the base stations. The term "cell" as used herein means the area associated with each base station in which that base station is the primary means of communication between any mobile terminals currently in that area and the fixed "backhaul" infrastructure. In practice, the areas within which the individual base stations can make reliable contact with mobile terminals generally overlap to some extent, making it possible to hand over a mobile terminal from one base station to another without interruption. In a self-organizing network it is also necessary for each base station to be able to detect the presence of its neighbors, which may be done by direct wireless communication or through a supervisory system.

The terms "macrocell" "microcell" and "femtocell" are used herein in a relative sense to describe cells, and their associated base stations, with different sizes of areas of coverage. Typically a macrocell covers a range of a few kilometers, and a microcell covers a smaller area of where infill of the macrocell network is required either because of high traffic levels or difficulties in coverage by the macrocell network because of obstructions—a typical location is a city street. Femtocells are intended for very small coverage areas, typically indoors, and are useful both at sites with difficulties with reception and where high data rates are required. It is expected that future cellular networks will be heterogeneous networks (HetNets), i.e., a mix of macro-cells for ubiquitous user experience and small cells or femto access points (FAPs) for high data rate transmission.

Cell outage detection is one of the main functions required in a self-healing mechanism. Most outage detection algorithms are focused on macro-cells rather than small cells. Most previous outage detection algorithms are not suitable for such networks due to the dense deployment nature of FAPs in the HetNets, as compared to the macro only deployments. Furthermore, there is high possibility of having sparse user statistics in small cells, since they usually support very few users as compared to macro-cells. Macro cells tend to be associated with permanent base stations. It is also more common for smaller cells to be added and removed from the network, as they are usually under the control of individual users rather than the network operator, and the user may wish to power down the base station when he is not using it himself, or to take it to another location.

It is known to implement a distributed outage trigger mechanism and sequential hypothesis testing within a predefined cooperation range, by analyzing the Reference Signal Received Power (RSRP) statistics of the users within the cooperative range. The FAPs monitor their neighbors over the "X2" interface (Inter-eNodeB interface defined in 3GPP) However, these systems do not take into account the possibility of devices going into sleep mode, so a FAP in idle/sleep mode will be mistakenly taken as an outage, which results in unnecessary compensation procedures, and more communications overhead.

These IP-based techniques are likely to result in the network overload especially when, as is expected, many thousands of femtocells are deployed. Polling via X2 also generates additional network traffic, and suffers from the same reliability issues as centralized polling. Polling from a local Home Hub may be useful (especially in case where there are no neighbor Femto cells to report an outage) but is at risk of a common failure mode (hardware/power/backhaul) such that two or more neighboring cells may be affected by a common cause and thus none of them are able to report the outage.

SUMMARY

In our co-pending application published as WO2017/162400, filed on the same date as this application), there is described a refinement in the "trigger" stage in which outages are only reported if a cell fails to be detected on consecutive sampling cycles.

The present disclosure relates to a refinement in the "trigger" stage in which base stations which are shutting down report the impending outage to their neighbors, allowing them to avoid unnecessary use of resources on repeated attempts to detect a base station that has shut down.

According to the present disclosure, in a first aspect there is provided a wireless communications base station having a data store for storing reference transmission characteristics, a receiver for detecting wireless transmissions transmitted by other wireless base stations, a sensor for searching for transmissions received by the receiver for transmissions having the reference characteristics, the sensor being configured to detect a first, hibernation, signal indicative that a neighboring base station is entering a first hibernation state in which it is scanning for transmissions from mobile terminals but is not transmitting a beacon signal, and to detect a second, shut down signal, indicative that a neighboring base station is entering a second state in which it is neither transmitting nor receiving, the sensor being configured to identify when a transmission having the reference characteristics ceases to be detected by the sensor, and a reporting system is configured to initiate a channel reallocation plan in response to the second, shutdown, signal, and to report a transmitter outage if the sensor system identifies that a transmission having the reference characteristics has ceased to be detected, and neither the first hibernation signal nor the second shutdown signal has been received.

In a complementary aspect there is provided a wireless communications base station having a transmitter configured to generate a signal to be detected by other wireless base stations, the wireless base station having an electrical power feed, having a sensor for searching for signals transmitted by mobile terminals, having a hibernation management system configured so that if the sensor detects no signals from mobile terminals it enters a first, hibernation, state, in which the sensor is in operation but the transmitter is not in operation, and configured so that if a loss of power to the power feed is detected it enters a second, shutdown, state in which neither the transmitter nor the sensor is in operation, and having a hibernation reporting system for generating a first signal for broadcast by the transmitter indicative of entering the hibernation state, wherein the reporting system is configured to generate a second signal in response to entering the shutdown state.

Both aspects may be embodied in a wireless communications base station capable of co-operation with similar base stations also embodying either or both aspects.

The wireless base station may be arranged to resume normal operation from the hibernation state in response to detection by the sensor of a user terminal, and is responsive to subscriber data transmitted by the user terminal to determine whether it is capable of connecting to the user terminal, and only resuming transmission if it has such a capability.

In the described embodiment the reporting system may respond to the second, shutdown, signal to initiate a channel reallocation plan.

The disclosure also provides a method for reporting wireless base station outages in which one or more transmitting base stations broadcast beacon signals and one or more scanning base stations search for the beacon signals, wherein if a transmitting base station detects of a loss of power supply, it broadcasts a signal indicative of the loss-of-power before shutting down transmission, and a scanning base station detecting the loss-of-power signal suspends searching for transmissions from the base station that transmitted the loss-of-power signal until a further signal is transmitted from the transmitting base station on detection of restoration of its power supply, and wherein, if a base station is in a "sleep mode" in which it is not transmitting, it transmits a hibernation signal distinguishable from the loss-of-power signal, wherein a scanning base station distinguishes between the hibernation signal and the loss-of-power signal, and in the event of a loss of power signal arranges a channel reallocation plan, in the event of a hibernation signal maintains the current channel allocation plan, and in the event of a beacon signal ceasing to be detected by a scanning base station when neither a hibernation signal nor a loss-of-power signal has been detected, the scanning base station generates an alert.

In one embodiment, a transmitting base station resumes normal operation after a hibernation in response to detection of a user terminal, wherein the base station is responsive to subscriber data transmitted by the user terminal to determine whether it is capable of connecting to the user terminal, and only resumes transmission if it has such a capability.

This broadcast "loss of power" signal can be picked up by the neighboring cells and used to update a store of reference values, thus avoiding a false alarm which would otherwise be generated when the cell fails to be detected on the next sampling cycle.

Conversely, if a base station is in a "sleep mode" in which it is not transmitting, typically because it can detect no base stations, it is nevertheless an active part of the network. In this case a loss of signal, as detected by neighboring base stations, could result in an unnecessary change in the frequency plan because the base station is wrongly identified as not being available.

Embodiments of the disclosure allow the self-organizing system to distinguish between a sleep mode, intentional disconnection of power, for example when the device is not to be used for a period of time such as at night or during holidays, and other causes of loss of signal from the transmitter such as a transmitter failure, or local interference from other radio sources.

Embodiments of the disclosure avoid the mistaken consideration of the "sleeping" base station for an outaged base station. When a base station is about to hibernate, it informs the other base stations within the collaborative range before it switches to sleep mode. The collaborative base stations will exclude this sleeping base station from the dual-stage outage detection. The collaborative base stations will wait a certain time t before checking again the status of this sleeping base station. Once they are informed by the sleeping base station that it is once again active, they will perform the dual-stage outage detection process described in our aforementioned co-pending application WO2017/162400).

It will be understood that typically a base station will have the capability to operate as both a transmitting and a receiving station according to the invention. However, it is not necessary for all base stations in the network to have the power-loss reporting capability. Should such a base station lose power, it will simply cease transmission and be handled by other base stations as an unexpected outage. Likewise, if any base stations are not equipped to recognize a loss-of-power signal and update the neighbor list accordingly, they will continue to scan for it in the conventional way. Thus base stations configured to operate in accordance with the disclosure may co-operate with conventional base stations in a communications network.

An energy-efficient process can be used to control "wake-up" from hibernation, in which the base station uses a sniffer and a micro controller to sense UE activity in order to switch between the sleeping and wakeup mode. When the base station senses UE activity, it wakes up only if the sensed UE is a subscriber to the network to which it is connected, thereby avoiding the unnecessary activation of the base station in case of presence of a non-subscriber UE in the vicinity. If no authorized UE activity is detected the shutdown process can be initiated, and the base station can inform the neighboring base stations that it is about to switch to the sleep mode. The collaborating base stations can then exclude this base station from the dual-stage detection. Consequently, the sleeping base stations will not be falsely detected as in outage. After the sleeping base station becomes active again, it can inform the collaborating base stations in order to be treated as normal.

The embodiment of the disclosure to be described uses interference signals between neighboring cells to detect outages of individual cells. If a signal ceases to be detected, the collaborative neighbors report it to the centralized Operation Administration and Maintenance system. This system requires little or no signaling overhead as each cell detects the normal transmissions of other cells.

In order to do this, each cell stores reference values, either retrieved from a look-up list provided by a central server, or stored as a record of recent sampling cycles, depending on whether the system is centrally organized or self-organizing.

BRIEF DESCRIPTION OF THE DRAWINGS

An embodiment of the disclosure will now be described with reference to the drawings, in which.

DETAILED DESCRIPTION

This embodiment also incorporates herein by reference the disclosure of our co-pending application GB2548805, with which the embodiment of the present disclosure may co-operate, although each may also be used independently of the other.

Figure 1:
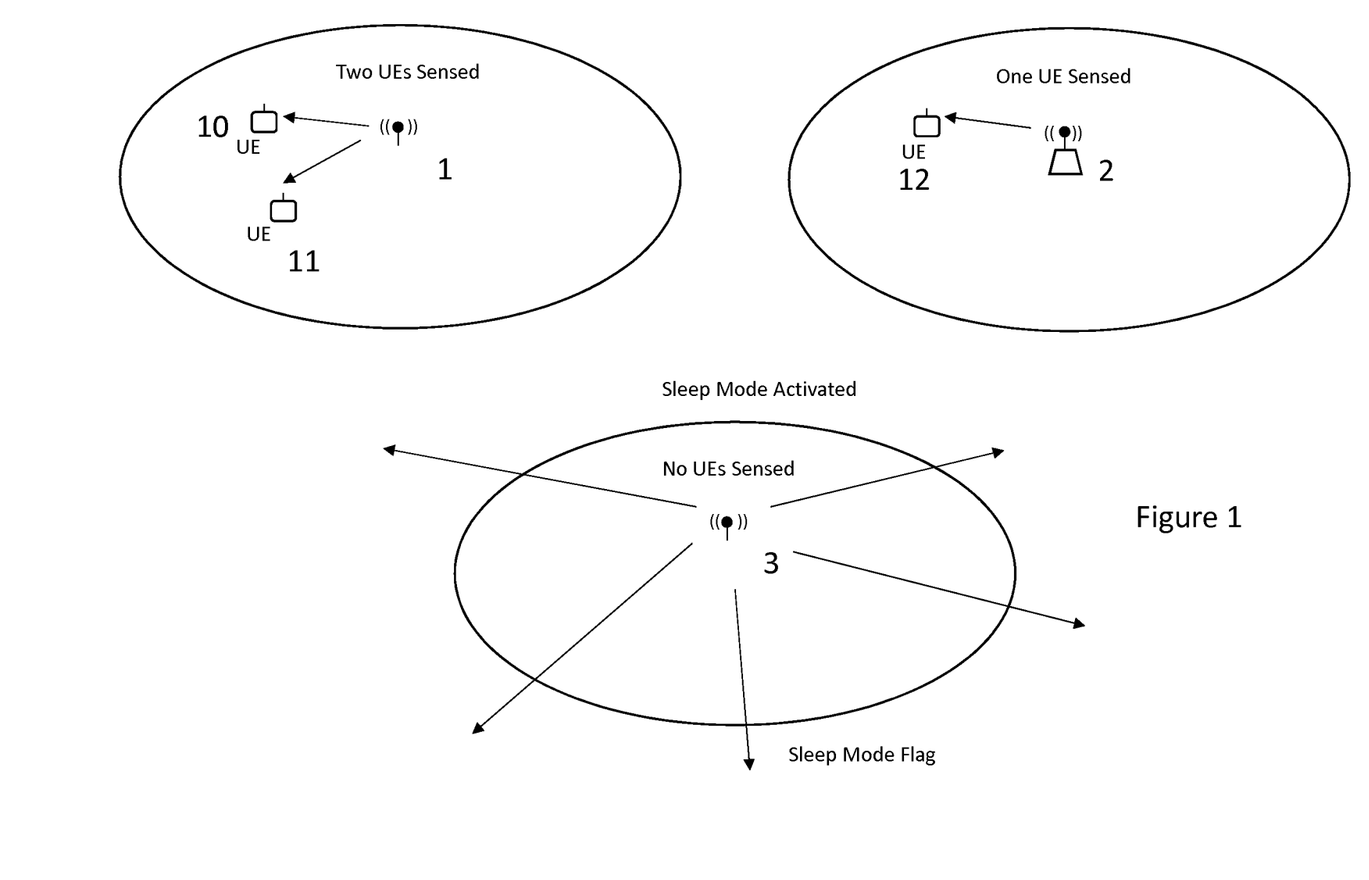
FIG. 1 is a schematic diagram representing a number of cellular base stations co-operating in the performance of the embodiment.

FIG. 1 depicts several base stations (femtocells) 1, 2, 3 and several user terminals 10, 11, 12, 14 capable of communication with the base stations when within wireless communication range of them. The coverage areas of the base stations may overlap, in which case handover of a mobile terminal is possible without interruption of service as the mobile station moves through the area within range of both. (It will be understood that there is no sharply-defined boundary to each base station's area of coverage, and the area depicted surrounding each base station in FIG. 1 should be taken as indicative only of the area within which signal quality exceeds some arbitrarily-defined value.) Thus a mobile terminal 14, at a greater distance, may still be able to communicate with the nearest base station. In practice, such areas are often of irregular shape, and may be of different sizes, depending on local topography, transmitter power, etc.

Figure 2:
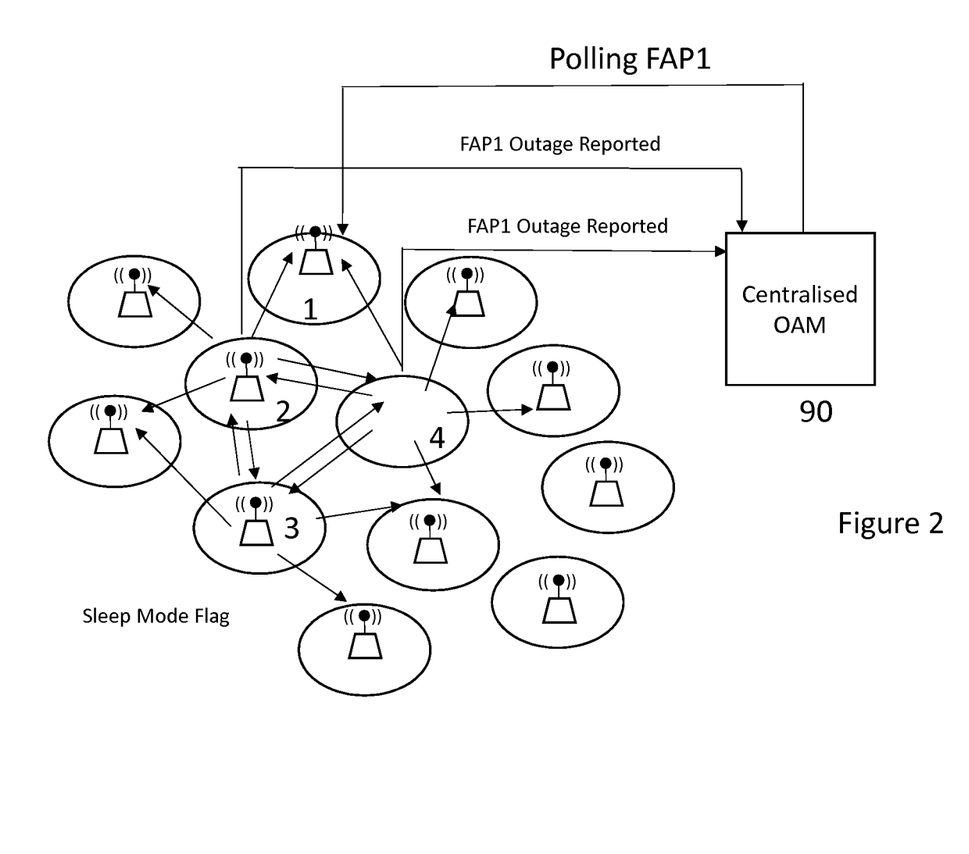
FIG. 2 is another schematic diagram representing a number of cellular base stations co-operating in the performance of the embodiment.

FIG. 2 illustrates a network of base stations (1, 2, 3, 4) operating in conjunction with an operation, administration and maintenance centre (OAM) 20 to perform the process of this embodiment.

The process uses interference signals from the collaborative neighbors to detect Femtocell Access Point (FAP) outages. As long as an FAP 1 radiates an interference signal to the neighbors' 2, 4, it is evidence of its presence. An outage is reported if none of the base stations that previously detected it can still do so. The process excludes from the detection process any FAP 3 that has reported that it has performed a "graceful" shutdown, and is in "sleep" mode so as not to be mistakenly taken as an outage. Once an outage detection is confirmed by a neighbor cell 2 for a given femtocell 1, the neighbor cell reports it to a centralized Operation Administration and Maintenance center (OAM) 90. The OAM co-ordinates these reports with those from other neighbor cells 4, and if all of them report a shutdown or an outage of the femtocell in question, the OAM 90 may take further action to collect data about the outaged FAP 1, which could help in identifying the root cause of the outage. This allows patterns or trends to be monitored—for example clusters of alarms should be investigated for a common root cause.

The base stations are capable of transmitting beacon signals, and to scan for beacon signals transmitted by other base stations to allow each base stations to determine what other base stations are nearby, to allow the base stations to operate as a self-organizing network in determining the frequency plan and signal strength to enable maximum coverage and minimum interference between base stations. The self-organizing system requires the base stations to co-operate with each other, usually under the overall control of an Operation Administration and Maintenance (OAM) system, to generate a frequency plan. The frequency plan controls the channels and the signal strength used by each base station to avoid interference between them. In particular, it is desirable that every mobile terminal in the area covered by the group of base stations should be able to communicate with at least one of the base stations, but no mobile station should be within range of two or more base stations operating transmitting or receiving on the same frequency.

The transmitter strength of the beacon signals is somewhat greater than that of the signals exchanged with the mobile terminals, as the beacons have to be detected by neighboring base stations, which will be further apart than the distance any mobile terminal would be from the base station it is working to. It is therefore desirable, both for power economy and interference reasons, to minimize the number of such signals and scanning sessions that are required.

The transmitter, typically a femtocell, has an internal electricity supply to operate a "graceful" shutdown process when the main power supply is cut off, and some limited functions during absence of an external supply. Femtocells may also power down into a sleep mode, if they are unable to detect any mobile stations in the vicinity, as shown for example for femtocell 3 in FIG. 1. In this mode, the base station continues to monitor for transmissions from mobile terminals which may come into range, but does not transmit a beacon signal until it detects a mobile terminal. A femtocell in this "sleep" mode will not be detectable by other base stations, which could therefore respond in the same way as if the sleeping femtocell has lost power.

Figure 3:
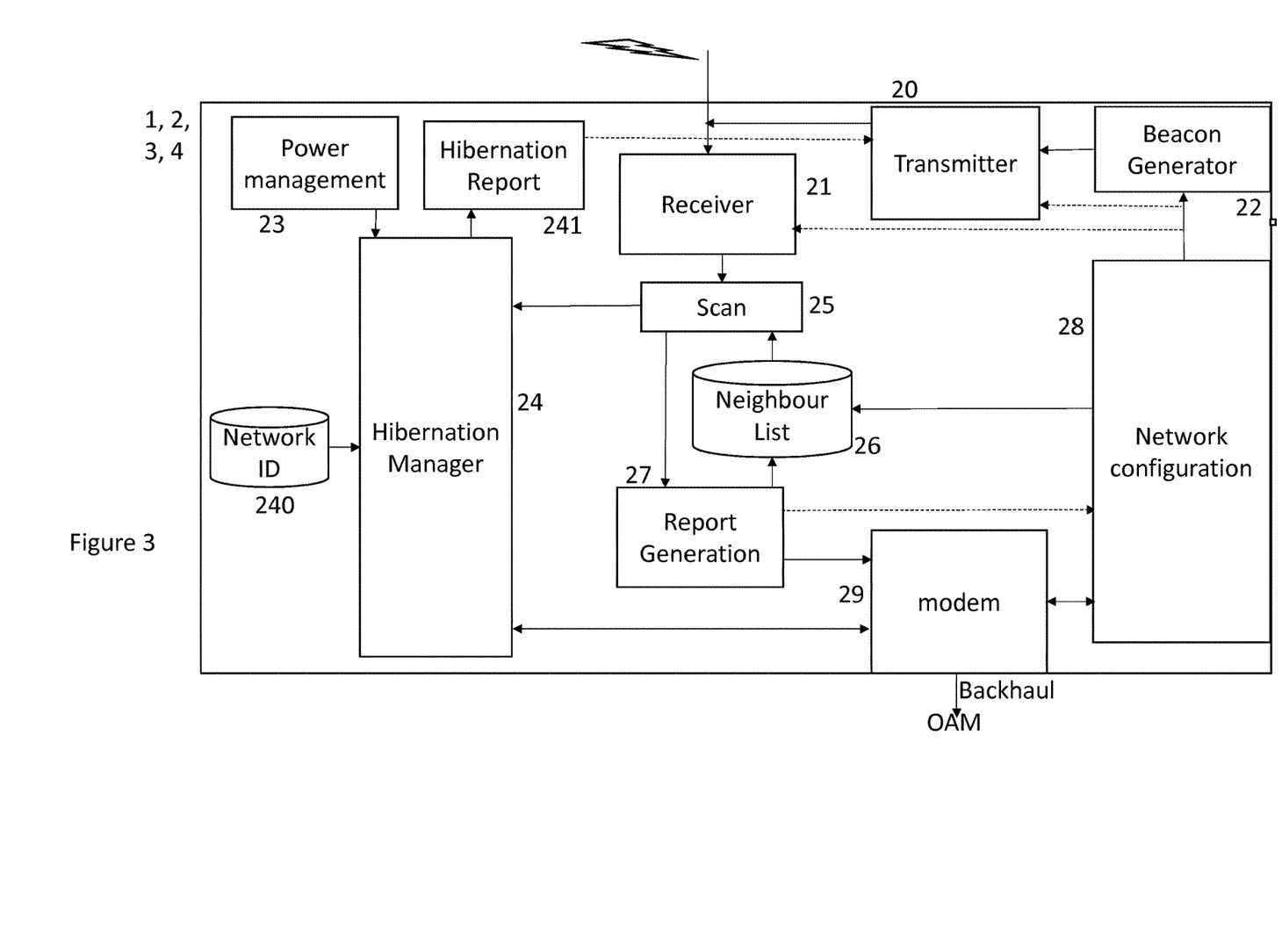
FIG. 3 is a schematic diagram of a base station configured to operate an embodiment of the disclosure.

A schematic diagram of the functional elements of one of the base stations 1, 2, 3, 4 is depicted in FIG. 3. It will be appreciated that the functions represented in FIG. 3 may be implemented as software or firmware, rather than as separate physical components. The base station comprises an RF interface comprising a transmitter 20 and a receiver 21, and a modem 29 connected through a communications network to the OAM 90. Communications traffic between mobile terminals and the network are handled through RF interface 20, 21 and the modem 29 in conventional manner.

When the base station is in operation a beacon generator 22 generates a signal for broadcast by the transmitter 20 to indicate to nearby receivers that the base station is in operation, and the channels it is operating on. A power management system 23 monitors whether the base station is connected to an external supply, and controls transfer to a more limited function set or "sleep" mode when external power is disconnected. In particular, a hibernation manager 24 is activated which generates a "hibernation" report for broadcast by the transmitter 20 before closing it down. A chargeable battery is integrated within the Femtocell Access Point (FAP). Once the user unplugs the FAP for any reason (cleaning, at night, during holidays, etc.) the power management system 23 detects the loss of mains power and the FAP switches to Battery Mode and reports the unplugging to the monitoring device (OAM, MBS, Neighboring FAPs, etc.) before it switches off (in few seconds). The FAP can use X2, S interfaces or radio signal to report the alarm. The other FAPs will stop monitoring this FAP, so no outage detection procedure will be performed on this FAP. That will prevent (False-Negative) the FAP from mistakenly considered to be in outage. This will eliminate time, effort and cost of the outage compensation procedures. Once the power cord is plugged again, the FAP reports the plugging alarm to the monitoring device. Consequently, the monitoring device will start the monitoring process (outage detection procedure) on this FAP. The same system is valid to the hub (Hub Unplugging & Plugging Alarm System (HUPAS)).

A more limited hibernation process may also be activated if the receiver 21 detects no mobile terminals 10, 11, 12, within range. In this case the receiver continues to operate, at reduced power, so that if a mobile terminal comes within range it will be detected and the base station can resume operation.

The base station also has a scanning system 25 for monitoring signals received by the receiver 21 to detect beacon signals generated by other base stations with range, as well as any hibernation reports. These are compared with data stored in a neighbor list 26 and a report generator 27 updates the neighbor list with any changes. The report generator 27 may also report any hibernations or outages to the OAM 90 through the modem 29 and the communications network, and instructions received through the modem 29 for any reconfiguration required as the network changes are forwarded to a reconfiguration manager 28 which updates the neighbor list 26, instructs the beacon generator 22 if a change in beacon signal is required, and if necessary alters the transmitter and receiver channels and signal strengths. Alternatively, if the system is self-organizing, the network configuration system 28 may operate autonomously in response to reports from the report generation system 27 resulting from the scanning process 25.

The self-organizing system 28 updates the channel frequency plan as base stations are added or removed from the system. However, efficient updating of the frequency plan can be compromised by temporary losses of signal from individual base stations, resulting in computer processing power having to be used to generate a new frequency plan to accommodate the loss of the station, only to have to be reversed if the base station is detected again on the next scan. Reorganizing the frequency plan can also require several handovers of mobile terminals, again requiring processing power and running the risk of dropping some sessions.

Conversely, receiver power can be wasted in continuing to attempt to detect base stations which have been deliberately powered down. The present embodiment includes measures to allow a base station to announce a deliberate power down, so that other base stations can immediately take account of its absence in the self organizing process, and also includes measures to inhibit a base station from reporting to the self organizing system unexpected losses of contact until it can be established that the loss is not transitory.

The process operated in this embodiment will now be described with reference to FIG. 4.

It will be understood that the process requires the co-operation of two or more base stations, more than one of which may be of the type depicted in FIG. 3, and in the following description the reference numerals for the respective functional elements in each base station should be taken as a reference to the relevant component in the appropriate base station 1, 2, 3, 4. However, it should be understood that there may also be base stations in the network that only have a limited set of the capabilities of the base station depicted in FIG. 3. For example, the reporting by a first base station of an outage in a second base station according to this embodiment can take place whether or not the second base station is capable of performing the "graceful" hibernation function. If it does not have this capability, any loss of contact with it will be reported as an unexpected outage. Likewise, not all base stations in the network may be capable of reporting outages or hibernations of their neighbors'.

Figure 4:
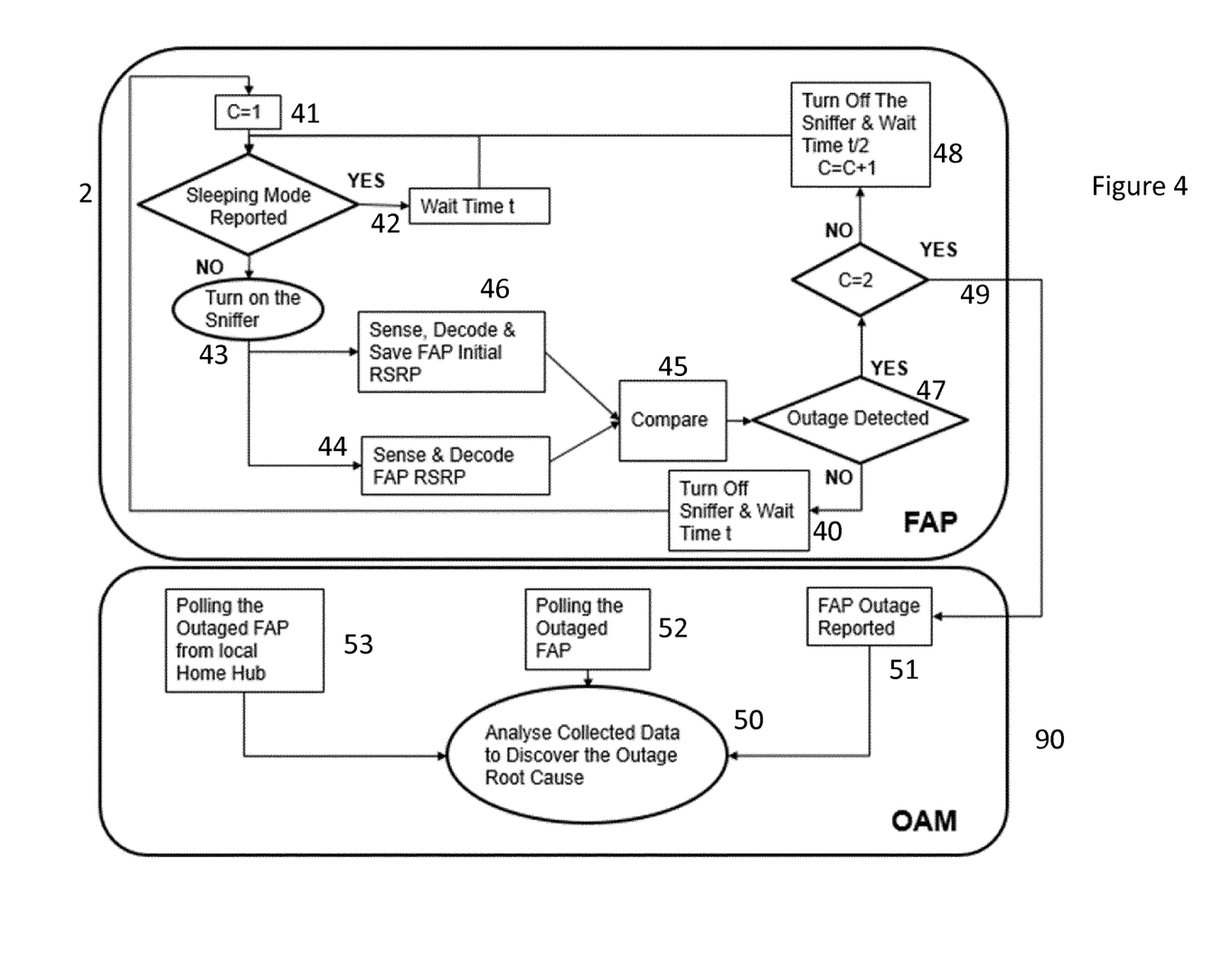
FIG. 4 is a flowchart for the operation of the outage reporting function of the embodiment, operated by a first base station and a coordinating server, detecting a shutdown or hibernation of a second base station.

The flow chart of FIG. 4 depicts the process by which a base station 2 or 4 (FIG. 2) detects an outage of a base station 1.

The dual-stage Outage detection is initiated in regular time intervals t (40). In the first stage of detection (Counter C=1) (41) each FAP 2, 4 within a certain collaborative range (R) monitors each neighboring FAPs' current RSRP statistics within a certain collaborative range. However, if a base station has reported that is in sleep mode, and that has been recorded in the neighbor list 25, the scanner is not operated and the process waits for the scanning interval t before resuming (42). For other base stations in the neighbor list 25, the scanner searches for the beacon signal (43). The range will be determined according to the sensitivity of the scanner. The scanner 25 may also be used to sense the user terminal activity, but operating to detect base station transmission frequencies and with a sensitivity adjusted to take account of the typically greater distances between neighboring base stations than the range required for communication with a user terminal.

Having detected the current RSRP for a neighboring base station (44) statistics are compared to the initial RSRPs from previously stored benchmark data 25 (45). The benchmark data is frequently updated (46) in case new FAPs are introduced into the network or any other changes occur within the collaborative range. If the decision statistic for a certain FAP is greater than a certain Threshold value (T), this FAP (e.g. FAP 1) is recorded as a potential outage. Otherwise, the scanning process is completed and the scanner waits for the interval t (40) If the comparison detects a potential outage (47) a second stage of detection takes place.

If the counter is currently set at C=1, it is re-set to C=2 and the scanning interval reduced to t/2 (48) after which a second scan 43 will take place. This avoids the accidental removal or rebooting of the FAP to be mistakenly consider as an outage.

If on repeating the process (43, 44, 45, 47), with the counter now set at C=2, an outage is again detected (47) a decision is taken to report the FAP as suffering an outage and a report is transmitted to the OAM 90 (49)

The OAM 90 receives the report from the FAP 2 (step 51) and, together with similar reports from other FAPs (e.g FAP 4) (52) and any information obtainable from the outaged FAP over its backhaul connection (53), performs an analysis (50) to determine the cause of the outage.

Centralized synchronization is used to manage the initiation of detection for the collaborative FAPs 2, 4. In addition to routine reports from FAPs 2, 4 having the outaged FAP 1 in their neighbor list, the OAM 90 may also initiate a polling process to cause a neighbor FAP 4 to make extra measurements in the event of a potential outage being reported, instead of waiting for the normal polling interval "t" to expire.

The initial decision for an outage to be reported to centralized Operation Administration and Maintenance (OAM) server is based on a decision statistic D, which is reported to the OAM assist the outage compensation process. The process will always be able to detect the outage regardless of the number of users within the collaborative range.

D is determined as follows:

$$D = RSRP - RSRP_0,$$

where RSRP is the normal RSRP statistics from the benchmark data and $RSRP_0$ is the sensed current RSRP statistic for a certain collaborative FAP.

The outage decision is based on the following equation:

$$D > T,$$

where T is a heuristically predefined threshold, which is dependent on the false alarm and misdetection rates.

The OAM will check the initial decision reported from the collaborative FAPs (FAP 2 and FAP 4) as shown in FIG. 3. If more than two FAPs within a certain collaborative range reported an initial decision of an outage for the same FAP, then the OAM will take the final decision that this FAP is in outage. The OAM will take further action to investigate this outage by polling the outaged FAP and request from the local home hub to poll it as well. Once these data are collected the OAM start analyzing it to determine the root cause of the outage (Hardware, Backhaul, etc.). That will allow patterns/trends to be monitored. For example, clusters of alarms may be investigated for a common route cause).

Subsequently, the OAM will start the necessary outage compensation scheme with the aid of the reported decision statistic (D). For instance, automated compensation of power levels by neighboring Femto Cells (i.e. Automatic Power Control, but with the opportunity to respond more quickly based on detected outage of neighbor cell).

Figure 5:
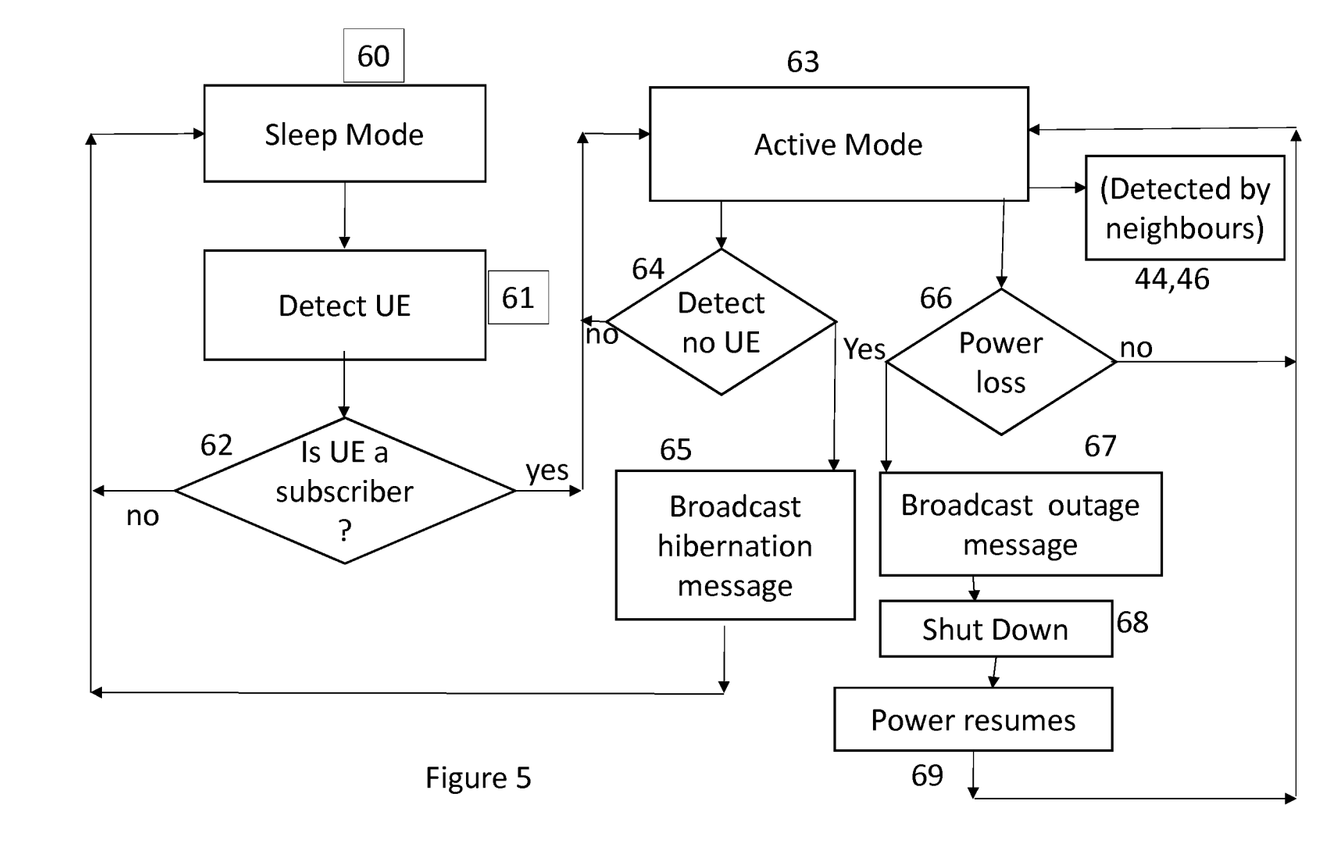
FIG. 5 is a flowchart of the sleep mode and shut down reporting function of the embodiment, as operated by a base station when it shuts down or hibernates.

The hibernation process will be discussed with reference to FIGS. 1 and 5, starting with the FAP in sleep mode (60). In this mode, the receiver and scanner are operating to detect any mobile terminals that are in the vicinity.

The FAP (femtocell) 3 is arranged to operate an energy-efficient process to control "wake-up" from hibernation, in which the femtocell 3 uses the scanner 25 and a hibernation management function 24 to sense activity of neighboring user terminals (also known as user equipment or UEs) in order to switch between the sleeping and wakeup mode. When the scanner 25 senses user terminals in the vicinity (61), it initiates a wake up process. In the first stage of this process it determines whether the UE detected (or any of them, if it detects more than one) is a subscriber for the network to which the FAP is operating (62), and only continues the "wake up" process if this is the case. Identification of the network to which a UE is operating may be done by reference to a data store 240 within the FAP, or by obtaining data on individual UEs from the OAM 90 through the backhaul connection through the modem 29. If a UE which can connect to the FAP 1 is identified, the hibernation manager activates the transmitter 20 and other functions (63), but the FAP is not activated and remains in Sleep mode (60) if the sensed UE is not its subscriber. This avoids the unnecessary activation of the FAP in case of presence of a non-subscriber UE in the vicinity.

Whilst in active mode, the FAP 4 can be detected by its neighbors 2, 3.

If, whilst in the active mode 53, the scanner identifies no authorized UE activity, a shutdown process 64, 65, 60 can be initiated, in which the FAP 3 informs the rest of the neighboring FAPs (FAP 2 and FAP 4 in FIG. 3) within the collaborative range before it switches to the sleep mode as shown in FIG. 2. The collaborative FAPs (i.e. FAP 2 and FAP 3), will exclude this FAP from the dual-stage detection. Consequently, the sleeping FAPs will not be falsely detected as in outage. After the sleeping FAP becomes active again (63), it informs the collaborative FAPs 2, 4, which detect the FAP (44,46, FIG. 4) and treat it as a normal neighbor, and also reports its status to the OAM 90 through the modem 29.

In the event of the power management system 23 detecting that an external power supply has been disconnected or otherwise lost (66) whilst in the active mode 63, the hibernation manager 24 activates a report generator 241 which generates a report for transmission to neighboring FAPs 2, 4 (67) informing them that it is shutting down. (A similar report may be sent to the modem 29, to inform the OAM.) The beacon generator 22, transmitter 20 and receiver 21 are then shut down (68) until power is restored (69) and the device is rebooted (returning to active mode 63). It should be noted that, unlike the condition when in sleep mode, when shut down the FAP is not scanning for user terminal (UE) activity.

Other FAPs, on receiving the sleep mode message 65 or the power outage message 67, update their neighbor lists 26 accordingly, so that when scanning (40, FIG. 4) they omit any FAPs reported as shut down or in sleep mode (42). Thus, the only FAPs that are reported by their neighbors' as possible outages (47) are those that are not hibernating or have undergone a "graceful" shutdown. These remaining outages will be from causes not detected by the FAP itself, such as a transmitter failure, or interference from other transmissions. This allows the network operator, through the OAM, to filter outage reports so as to disregard outages triggered by customers turning off their base stations (FAPs) or when an FAP has gone into sleep mode. The process is also able to differentiate between cell outage and sleeping cells, and avoids false outage alarms generated from accidental unplugging or rebooting the FAP, minimizing the cost and effort generated by false alarms and misdetection.

The invention claimed is:

1. A wireless communications base station comprising:
   a data store for storing reference transmission characteristics;
   a receiver for detecting wireless transmissions transmitted by other wireless base stations;
   a sensor for searching for transmissions received by the receiver for transmissions having reference characteristics, the sensor being configured to detect a first hibernation signal indicative that a neighboring base station is entering a first hibernation state in which the neighboring base station is scanning for transmissions from mobile terminals but is not transmitting a beacon signal, and to detect a second shut down signal indicative that a neighboring base station is entering a second state in which the neighboring base station is neither transmitting nor receiving, the sensor being configured to identify when a transmission having the reference characteristics ceases to be detected by the sensor; and
   a reporting system configured to:
   initiate a channel reallocation plan in response to the second shutdown signal, and determine that
   the sensor identifies that a transmission having the reference characteristics has ceased to be detected,
   the first hibernation signal has not been received, and
   the second shutdown signal has not been received, and
   in response to the determining, report a transmitter outage.

2. A method for reporting wireless base station outages comprising:
   broadcasting, by one or more transmitting base stations, beacon signals;
   searching, by one or more scanning base station for the beacon signals;
   if a transmitting base station detects of a loss of power supply, broadcasting by that transmitting base station a loss-of-power signal before shutting down transmission;
   by a scanning base station, the loss-of-power signal and suspending searching for transmissions from the transmitting base station that transmitted the loss-of-power signal until a further signal is transmitted from that transmitting base station on detection of restoration of power supply;

if a base station is in a "sleep mode" in which the base station is not transmitting, transmitting by that base station a hibernation signal distinguishable from the loss-of-power signal; and distinguishing, by a scanning base station, between the hibernation signal and the loss-of-power signal, and:

in the event of a loss-of-power signal, arranging a channel reallocation plan, in the event of a hibernation signal, maintaining a current channel allocation plan, and following a determination of the beacon signal ceasing to be detected by a scanning base station, the hibernation signal not being detected, and the loss-of-power signal not being detected, generating an alert.

3. The method according to claim 2, further comprising:

detecting the broadcast loss-of-power signal by one or more receiving base stations; and using the detected loss-of-power signal to update a neighbor list in the one or more receiving base stations.

4. The method according to claim 2, further comprising:

resuming normal operation by a transmitting base station after a hibernation in response to detection of a user terminal, wherein the transmitting base station is responsive to subscriber data transmitted by the user terminal to determine whether the transmitting base station is capable of connecting to the user terminal, and wherein the transmitting base station only resumes transmission if the transmitting base station has such a capability.

* * * * *